Figure 1A:
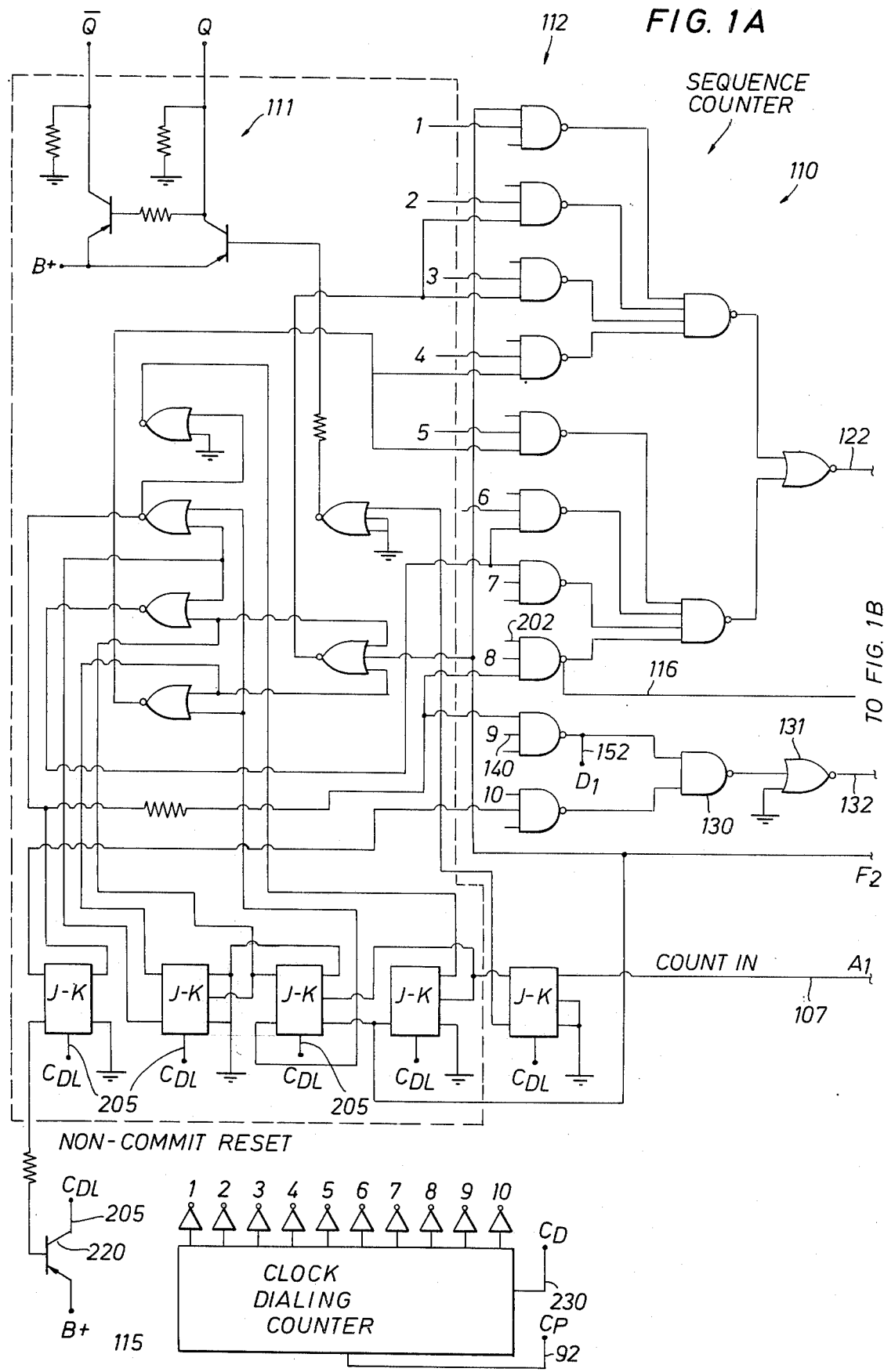

United States Patent [19]

Willis

[11] 3,987,246

[45] Oct. 19, 1976

[54] APPARATUS FOR AUTOMATICALLY SENDING DATA OVER A TELEPHONE SYSTEM FROM A REMOTE STATION TO A CENTRAL STATION

[75] Inventor: John R. Willis, Houston, Tex.

[73] Assignee: Electromitor, Inc., Amelia, La.

[22] Filed: May 19, 1975

[21] Appl. No.: 578,480

Related U.S. Application Data

[60] Continuation-in-part of Ser. No. 275,684, July 27, 1972, abandoned, which is a division of Ser. No. 56,883, July 21, 1970, Pat. No. 3,702,902.

[52] U.S. Cl. .............................. 179/2 A; 179/5 R
[51] Int. Cl.² ...................................... H04M 11/04
[58] Field of Search ............. 179/2 A, 2 DP, 4, 5 R, 179/5 P; 340/213.1, 213.2, 226, 298, 314

[56] References Cited

UNITED STATES PATENTS

| | | | |
|---|---|---|---|
| 3,131,376 | 4/1964 | DuVall | 340/314 |
| 3,233,232 | 2/1966 | Brennon | 340/298 |
| 3,582,555 | 6/1971 | Kok | 179/5 R |
| 3,626,098 | 12/1971 | Lee | 179/5 R |
| 3,800,091 | 3/1974 | Glidden et al. | 179/4 |
| 3,801,743 | 4/1974 | Westbeck | 179/2 A |
| 3,842,208 | 10/1974 | Paraskevakos | 179/2 A |
| 3,866,206 | 2/1975 | DeGiorgio et al. | 340/226 |
| 3,883,695 | 5/1975 | Bickel et al. | 179/5 R |

Primary Examiner—Kathleen H. Claffy
Assistant Examiner—Gerald L. Brigance
Attorney, Agent, or Firm—Jennings B. Thompson

[57] ABSTRACT

The apparatus disclosed is for use with conventional automatic dialing telephone equipment and includes a master or central station and a remote, automatically triggered, dialing station. The remote station is triggered by an alarm device of no particular interest to the present invention, such as one to indicate an intruder or a fire. The remote station, once triggered, electronically dials the assigned sequence of numbers by forming the necessary make and break signals for the conventional telephone equipment found at the telephone exchange to connect the remote station to the central station through the telephone system. When the connection is completed, the central station sends a tone pulse to the remote station to verify the completion of the connection. The remote station then transmits data to the central station by spaced tone pulses. Simultaneously with the receipt of each tone pulse, the central station sends a tone pulse to the remote station of a preselected amplitude and frequency having the same duration as the tone pulse from the remote station to verify receipt of the tone pulse. If the remote station fails to receive such a verification pulse, the connection is broken and the cycle of dialing and sending data is repeated.

1 Claim, 5 Drawing Figures

APPARATUS FOR AUTOMATICALLY SENDING DATA OVER A TELEPHONE SYSTEM FROM A REMOTE STATION TO A CENTRAL STATION

This is a continuation-in-part of application Ser. No. 275,684, filed July 27, 1972, now abandoned, which is a division of application Ser. No. 56,883, filed July 21, 1970, which issued as U.S. Pat. No. 3,702,902.

For about the last 60 or 70 years, fire or alarm companies have utilized straight line connections from a subscriber or customer to a central data collection point as a basic means of implementing fire protection or an alarm system. The ADT Company has engaged in these activities for a number of years wherein a particular subscriber is wired to the central data collection station of the company and the incoming data from several customers is monitored by an individual at the station. He responds to various lights, bells, or other signals to carry out the necessary emergency actions which are dictated by the nature of the alarm. Quite often, these central stations are connected to the various subscribers through the use of dedicated lines. Dedicated lines are those which have only one customer, or one class of customer, connected to them. Dedicated lines are quite expensive and must be wired around the telephone terminal equipment and must be handled in a unique manner as they cannot be permitted to pass through the conventional cross-bar dialing equipment. Even today, when electronic switching in terminals is contemplated, and cross-bar equipment is obsolete, nevertheless, dedicated lines still present problems to central telephone stations and equipment. Even if it were possible to locate all dedicated lines in a conventional trunk line extending from the central station to the outreaches of its given neighborhood there are still problems in the use of dedicated lines.

Some have suggested the use of telemetry on various and sundry radio frequencies such as those in an area where a television channel is not used. Telemetry transmissions are, of course, not secure, and telemetry transmitters and receivers require relatively expensive antennas. As the frequency of the telemetry system increases, the cost of fabrication and installation goes up. When the frequency becomes too high, one is forced to resort to exotic antennas and wave guide systems for handling the systems. It will be understood and appreciated that the cost and complexity of such aa system is far beyond that which can be borne by equipment of the nature described in the present disclosure.

Another problem with such systems is the possibility that the data transmitted from the remote station will become garbled or lost. Where the central station is receiving calls from several remote stations, one of the bits of information transmitted is the identification of the remote station calling. Also, a remote station may have several sensors connected to it each of which indicates a different problem. For example, a remote station may have one sensor to detect heat or smoke to indicate a fire, another to detect intruders, and another to detect a malfunction in equipment, such as a refrigeration system. If the data transmitted becomes garbled, for example, if the signal received by the central station indicates a fire when, in fact, there was an intruder or the refrigeration system failed, the fire department would answer a false alarm. The possibility of such malfunctions have greatly retarded acceptance of automatic monitoring systems by fire and police departments and it is an object of this invention to verify that the data transmitted by the remote station is the data received by the central station.

Many other problems could be noted in passing. However, the foregoing problems are representative of the cumulative problems presented with equipment found competitive with the device of the present invention. The device of the present invention constitutes an improvement of the competitive equipment in numerous regards. The equipment of the present invention will be described in detail hereinafter, however, a summary of the equipment and its function will be given first.

A central station is adapted to be connected to a conventional pair of telephone lines. While the equipment must be duplicated, the preferred embodiment will be described with a single pair of lines. A number of remote stations are located in the near vicinity. The stations are located at a distance and spacing from the central station to permit dialing of the central station with the conventional seven digit number. That is to say, the remote stations are not located at such a distance where a long distance call between the two stations would be required. The remote stations are preferably placed about the premises or facilities of someone desiring protection, and hence, the remote facilities are normally connected with various alarm devices which respond to intruders, fire, equipment failure, and the like. The remote stations are utilized as alarm devices. Each remote station is equipped with an adjustable mechanism whereby the telephone number of the central station is set into the remote station. Once the main number is set in, the remote station is equipped to call the central station. On the creation of the alarm condition as sensed by various transducers connected with the remote station, it begins a sequence wherein, in a predetermined sequence, the telephone number of the central station is first called. When the call is completed, the central station sends a verification signal to the remote station to indicate that the call has been correctly placed. After this, data indicative of the nature of the alarm and identification of the remote station is then transferred to the central station. This is accomplished through conventional telephone equipment which may include the exchanges of a large, major city, or through equipment found in other locations.

The data is sent in spaced tone pulses. Upon the receipt of each data pulse, the central station simultaneously sends a verification signal to the remote station. If the proper verification signal is not received, the remote station automatically breaks the connection and starts the cycle over again, including dialing and data transmission. The dialing cycle is repeated as well as the data transmission because the failure to receive the verification pulse may be due to a break in the telephone connection. Single repeating the data transmission obviously would be fruitless, therefore, the dialing cycle is repeated each time a verification pulse is not received for each data pulse transmitted.

In any case, the call is made and completed through conventional telephone equipment and the equipment is then disconnected or permitted to continue in the customary manner. The central station then has the data and such alarm conditions can be implemented at that juncture as are necessary.

Figure 1B:
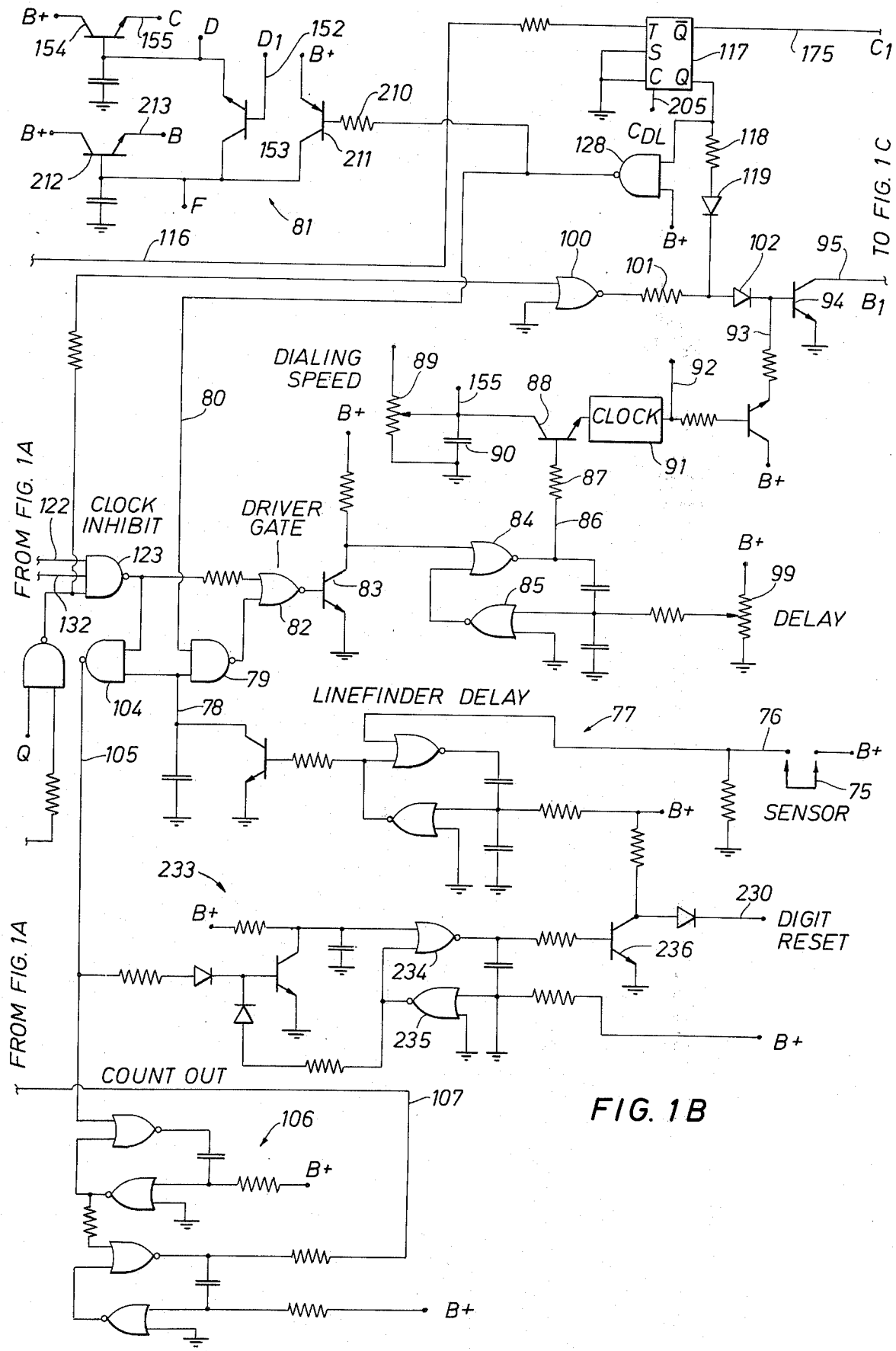
Figure 1C:
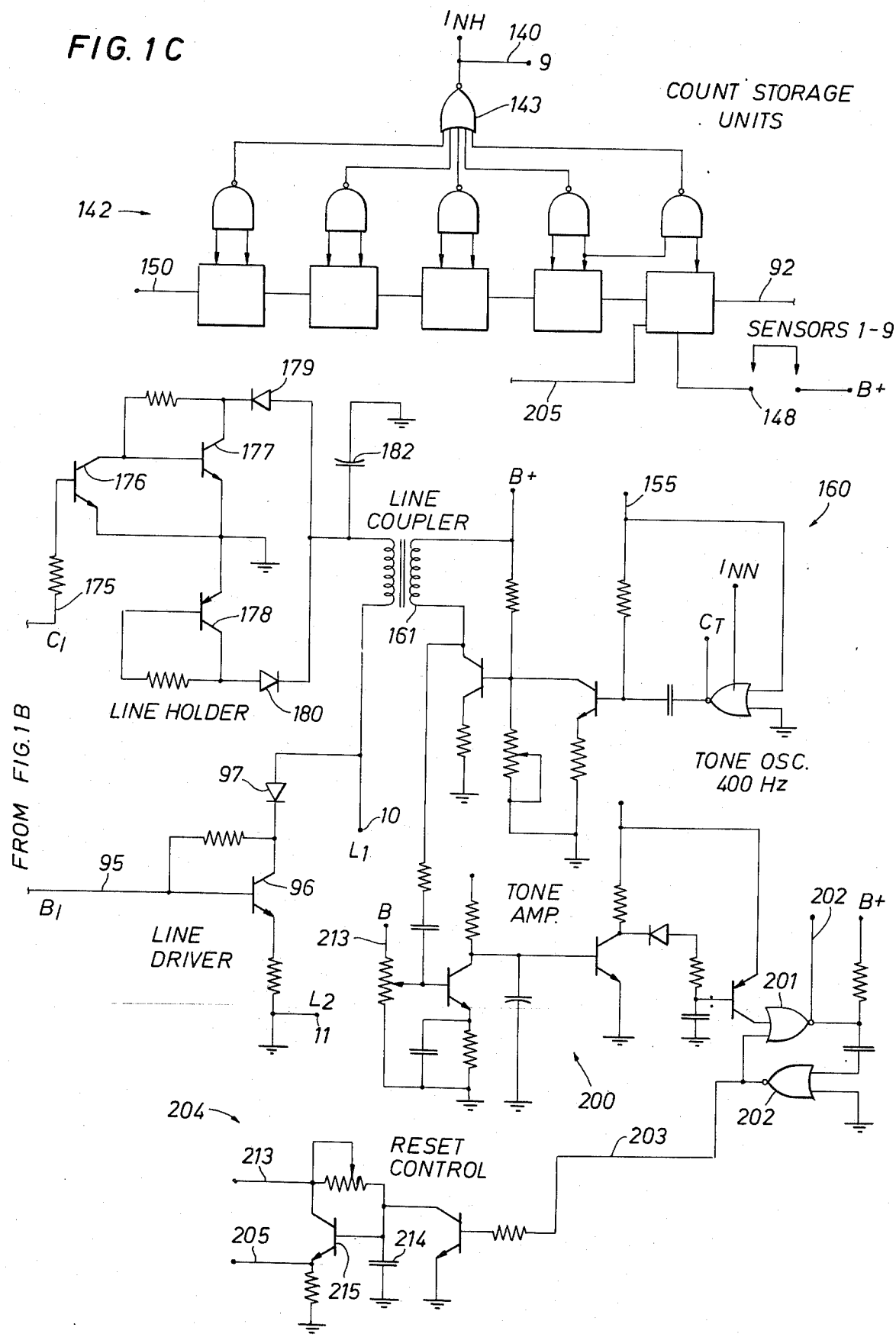
Figure 2A:
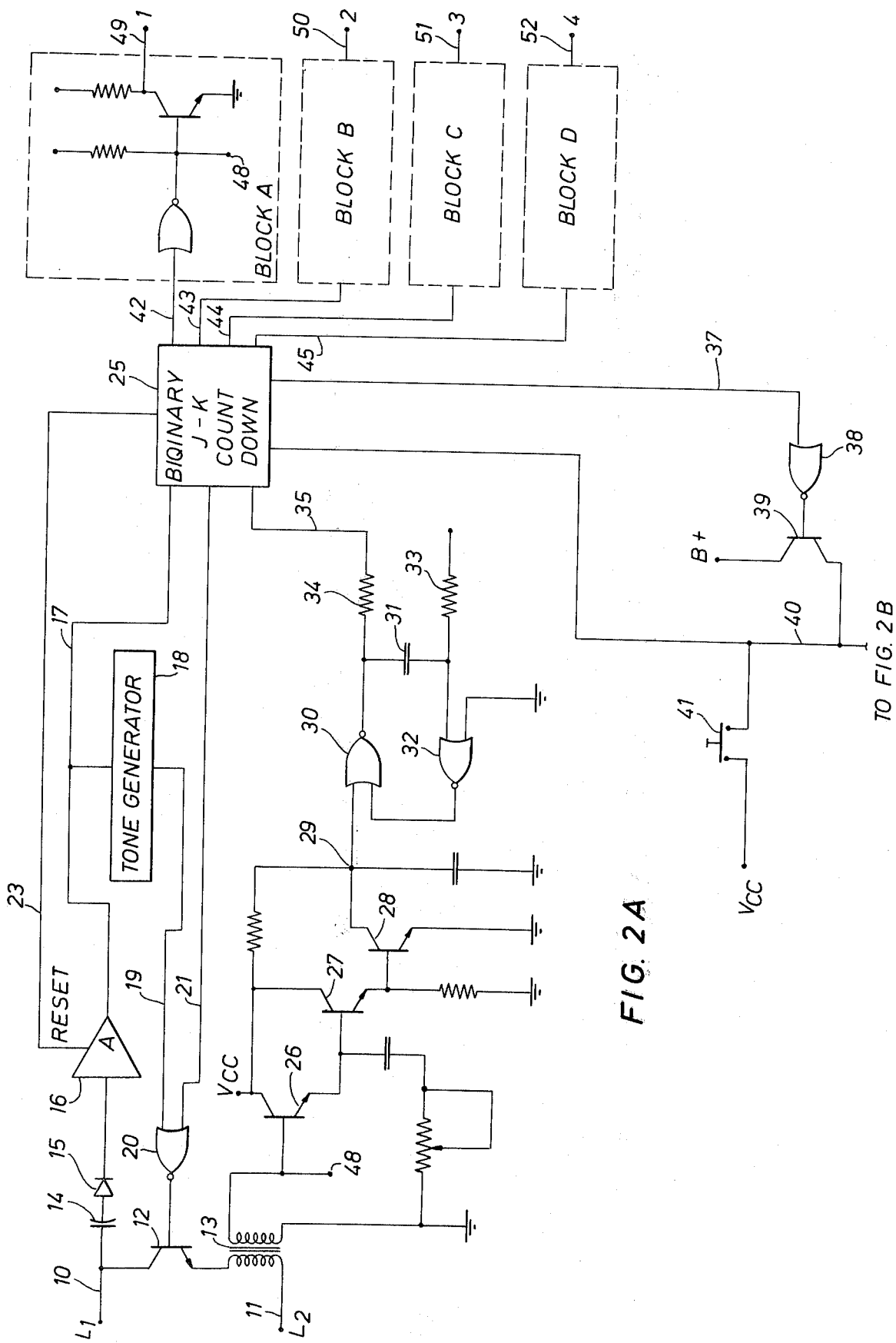
Figure 2B:
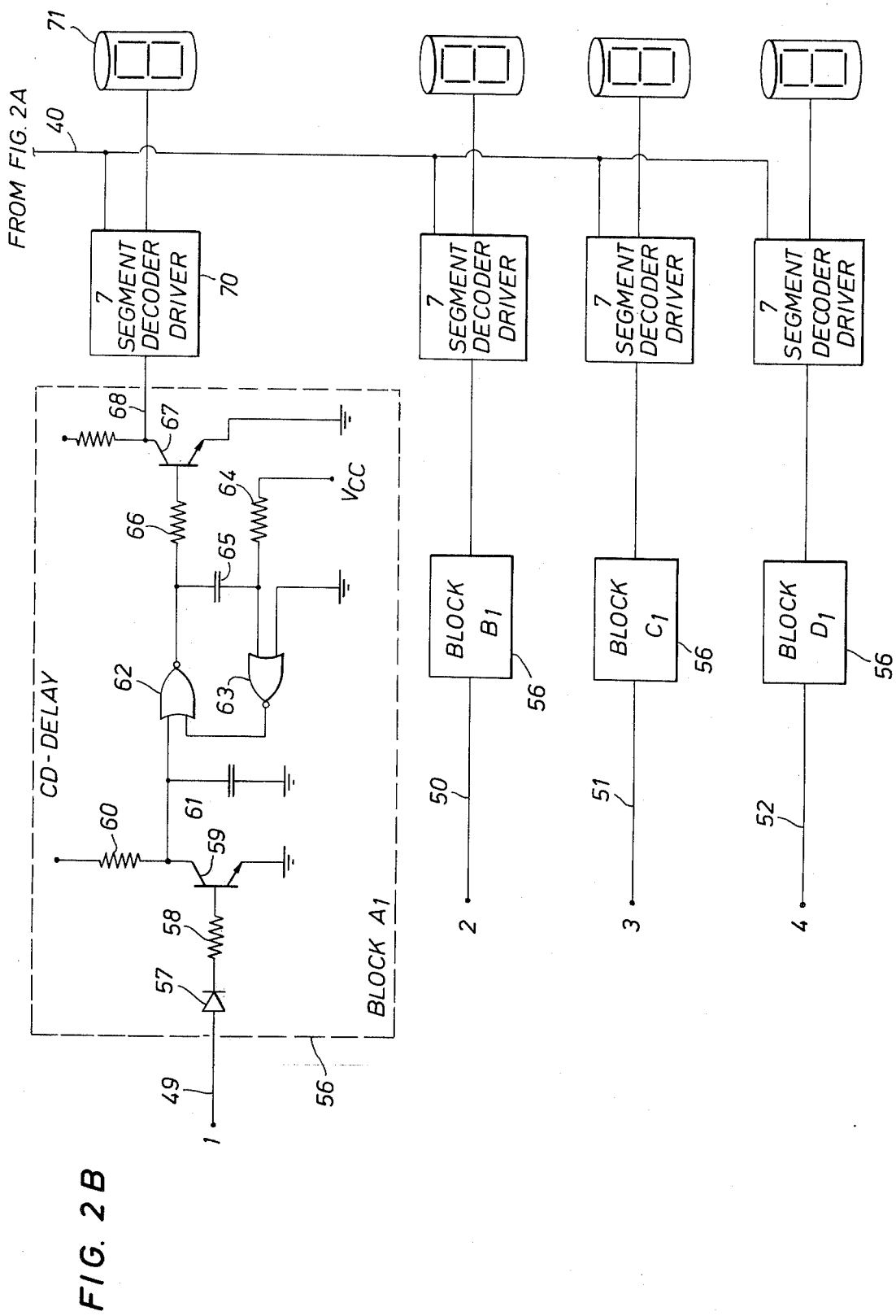

For a more complete understanding of the present invention, reference is made to the following specification and drawings, which are:

FIGS. 1A, 1B, and 1C are schematic wiring diagrams of different portions of the preferred embodiment of the remote station of the apparatus of this invention; and FIGS. 2A and 2B are schematic wiring diagrams of different portions of the preferred embodiment of the central station of the present invention.

In the drawings, attention is first directed to the central unit or station shown in FIGS. 2A and 2B. The central station will be described first, and thereafter, the remote station shown in FIGS. 1A, 1B, and 1C, will be described. It is believed that description of the central station, which is relatively simple in comparison with the remote station, will slightly enhance and make easier the understanding of the remote station. For this purpose, attention is first directed to FIG. 2A of the drawings.

In FIG. 2A, the numerals 10 and 11 identify a pair of lines which are adapted to be connected with a conventional telephone system. The lines are customarily known in the trade as the tip and ring lines. They are connected through various and sundry types of telephone equipment found in a typical telephone system, the nature of which is beyond concern of the present disclosure. The two lines are input with switching transistor 12 connected therebetween, which controllably meters circuit flow through the primary of transformer 13.

In the initial or quiescent condition, lines 10 and 11 merely reflect an open circuit back into the telephone equipment. This is what is customarily required. An open circuit is one in which the line-to-line impedance exceeds about 10,000 ohms, while a connection is normally characterized by impedance in the range of 1,000 ohms. On receipt of an incoming call, the signal is conducted down line 10 and through DC blocking capacitor 14, rectifying diode 15, and to amplifier 16. Amplifier 16 turns on and forms an output signal on conductor 17. The signal on conductor 17 is applied to tone generator 18 which forms a signal on conductor 19 returning to NOR gate 20. The NOR gate 20 has second conductor 21, and it will be presumed at this juncture that a signal is present on conductor 21. When the two signals to the NOR gae coincide, it turns on switching transistor 12 which thereby permits current flow in the primary of transformer 13. Upon achieving current flow, the signals are then coupled into the secondary of the transformer and into other circuitry as will be described.

Returning to amplifier 16, it will be noted that it has conductor 23 which is utilized to reset or terminate operation of the amplifier. Moreover, conductor 23 is from a biquinary J-K count down circuit indicated by the numeral 25. Pulses are supplied over conductor 17 to count down circuit 25 to be counted, and upon termaination of its necessary operation, it forms a reset signal on conductor 23 which terminates operation of switching transistor 12 and the functioning of NOR gate 20.

From the foregoing, it will be understood how pulses received by the central station over the telephone lines from the remote station are passed through transformer 13 and into the equipment which thereafter responds to the pulses. At this juncture, the description will continue setting forth the nature of the response to the pulses fed into the equipment.

As shown in FIG. 2A, the secondary of transformer 13 is connected with emitter follower transistor 26, which provides an input to additional transistor 27. Transistor 27 is likewise an emitter follower and forms an output signal connected to additional transistor 28. Transistor 28 is connected to junction 29 where a signal in the form of one or two voltage levels is formed. It must be emphasized that the equipment is operative with pulses. Hence, frequency content is of no particular concern. Inasmuch as it is dealing with pulses, the pulses are simply converted to two levels at junction 29. The levels will be termed high and low, and true and false for later discussion hereinafter.

Junction 29 then forms belevle signals which are input to additional NOR gate 30. The output of NOR gate 30 is connected through storage capacitor 31, the value of which will be discussed hereinafter, and is then applied to the input of additional NOR gate 32. As shown in FIG. 2A, NOR gate 32 is connected back to the input of gate 30. Through the use of appropriate bias voltages connected through resistor 33, and the loading created by resistor 34, circuit values can be readily calculated whereby a monostable multivibrator is defined including NOR gates 30 and 32. In essence, the circuit responds to the silence or absence of pulses which exists between the spaced data pulses from the remote station.

The data transmitted to the central station is in the form of digits. There must be a gap or space between adjacent digits. Adjacent digits must be recognized and discriminated one from the other. The apparatus in question thus forms a pulse on conductor 34 which is input to countdown circuit 25 to advance it from one state to the next. That is to say, countdown circuit 25 counts the number of pulses in a first group or tone burst, and thereafter counts another group. Two groups are separated as indicated by the signal on conductor 34 which presets countdown circuit 25 to count again from zero thereafter.

Conductor 37 identifies an end or word or end of group conductor which comes up in level at the conclusion of the data transmitting sequence. Conductor 37 is input to NOR gate 38 which forms an output through switching transistor 39 to change the level on conductor 40. This conductor is also connected with pushbutton switch 41 which is connected to an appropriate positive voltage. Transistor 39 prepares conductor 40 for formation of a reset pulse. Moreover, a manual reset is provided through implementation of switch 41. It should be noted that switch 41 is unable to achieve a reset unless and until the complete counting cycle has been completed. In other words, countdown circuit 25 must recognize and count all pulses transmitted from the remote unit before a signal is formed on conductor 37 thereby enabling operation of transistor 39. Switch 41 can be utilized to alter the level on conductor 40 to form a reset pulse. The reset pulse is applied to countdown circuit 25 and also to additional circuitry shown in FIG. 2B to reset the readout equipment as will be described later in detail.

Countdown circuit 25 counts the number of groups or individual digits transferred from the remote station and forms output levels on conductors indicated by the numerals 42, 43, 44, and 45. The four conductors mentioned are connected to four preferably similar blocks and provide enabling signals directing the actual pulses themselves to individual decoding circuits which will be described later. That is to say, counter 25 recognizes only a whole digit, not the value of the digit itself, and forms enabling signals on the conductors 42, 43, 44, and 45. The apparatus has been shown with four similar blocks although the number may be varied in accordance with the needs of a particular installation.

The numeral 48 identifies a conductor which is connected to the secondary of the transformer 13. Conductor 48 is likewise input to all the blocks, A, B, C, and D. This is the input which provides the individual pulses to all of the blocks. However, it will be recalled that only one of the blocks is enabled. Since only one is enabled, the pulses input from conductor 48 are passed only by one of the several devices indicated in FIGS. 2A. The outputs are formed on a number of conductors which are indicated by the numerals 49, 50, 51 and 52. These conductors are shown continued on FIGS. 2B.

In FIG. 2B, conductors 49-52, inclusive, are shown input to additional circuit elements which are preferably similar. The numeral 56 indicates the first circuit element which is connected to the conductor 49. This circuit element 56 is duplicated at additional locations in FIGS. 2B and as shown, is provided with inputs from conductors 50, 51 and 52. Briefly, a string of pulses is periodically gated through conductors 49-52, inclusive. When the pulses are properly enabled by the equipment described in FIG. 2A, pulses are then input through blocking diode 57 and series dropping resistor 58 to transistor 59. Transistor 59 functions as a conventional amplifying transistor having collector load resistor 60. Any AC signals on the output of transistor 59 are grounded by grounded capacitor 61. The output of transistor 59 is next input to NOR gate 62 which, in conjunction with additional NOR gate 63, forms a monostable multivibrator. The monostable multivibrator further includes bias resistor 64, timing capacitor 65, and output series resistor 66. Dependent on the component values selected for resistors 64 and 66 and the size of capacitor 65, a pulse is formed by the monostable multivibrator which is input to transistor 67. Transistor 67 provides an amplified output on conductor 68 which is then input to decode driver 70. The decode driver is particularly constructed and arranged for forming a visible output signal on a seven segment indicator lamp, indicated by numeral 71. The decode driver is a bought item, and it is believed and submitted that its details of construction and circuitry are well known to those skilled in the art and need not form a part of the present disclosure except to mention their utilization. Moreover, decode driver 70 responds to the number of counts which are input to it to appropriately luminate visible output tube 71 as is the customary manner to form a signal which is readable visually by the operator of the central station being described in FIGS. 2A and 2B.

As shown in FIG. 2B, the equipment within block 56 is duplicated on the other three conductors. The seven segment decode driver is duplicated also. The preferred embodiment of the remote station preferably provides a data output which is four digits in length, and hence, four decode drivers are utilized with four light output tubes.

It will be noted that conductor 40 from FIG. 2A is connected to each decode driver. Conductor 40 is the reset which, on operation of manual switch 41, terminates the signals indicated by the visible light output tubes and resets the various decode drivers to zero.

While the foregoing sets forth the operation of the central station in detail, it is helpful to point out two or three significant factors in its operation. One is that it forms a tone which provides a verification signal to the remote station upon receipt of each data pulse from the remote station. Attention is redirected to tone generator 18 and NOR gate 20 which is driven by its output. In effect, the tone generator provides a tone of sufficient amplitude and hence, sufficient excursion to drive the NOR gate from cutoff to saturation rather rapidly. This creates a relatively ragged square wave which is output through switching transistor 12 and hence forms a chopped signal in the primary of transformer 13. The inductance of transformer 13 is sufficient to slightly round off the square wave and to cause the transmission on the lines 10 and 11 of a signal which is almost a clean signal. The signal transmitted has a preselected frequency which is determined by that of the tone generator. The signal is received by the remote station unit in the form of verification of the receipt of a pulse from the remote station and the length or duration of operation of the tone generator is coincident with each pulse received by the central station from the remote station.

The foregoing describes the central station and its operation will now be correlated to that of the remote station shown in FIGS. 1A, 1B, and 1C together. While substantial quantities of telephone handling equipment intervent between the two devices, nevertheless, attention is next directed to the lines 10 and 11 which are shown in FIG. 1C of the drawings.

A logical sequence of the operation of the remote station will next be described. While the common point between the central and remote stations is telephone lines 10 and 11 shown in FIG. 1C, nevertheless, it seems appropriate to consider operation of the remote station shown in these three drawings beginning with operation of a sensor, such as sensor 75 shown in FIG. 1B. The sensor is any type or sort of device which forms an alarm condition by forming a voltage at an appropriate supply level on conductor 76. Conductor 76 shown in FIG. 1B may be only a few inches long, or may be of great length extending about the premises; and may be connected to quite simple or complicated sensing devices. In any case conductor 76 is an input from some form or fashion of switch means which provides an increased voltage level on conductor 76. Conductor 76 may also be paralleled to many alarm devices which function in different manners. In any event, all the devices function to place an appropriate voltage level on conductor 76 which is detected by the apparatus and which initiates its operation.

Conductor 76 is input to a line finder delay circuit which is indicated generally by the numeral 77. Circuit means 77 forms an output on conductor 78 after an appropriate delay. Given the chanced possibility that sensor 75 may close for an intermittent interval to possibly create a spurious signal, line finder delay signal 77 preferably operates after sensor 75 has completed its connection for a substantial period of time, perhaps in the range of five hundred milliseconds. While this factor can be adjusted depending on the need and environment of the installation nevertheless, after some delay, a signal is formed on conductor 78 indicating that line finder delay circuit 77 is timed out. Similar to other delay circuits, the line finder delay circuit is a pair of NOR gates appropriately connected to form a single shot multivibrator. Conductor 78 is responsive to a negative going signal from line finder delay circuit 77 to trigger operation of additional circuitry.

Conductor 78 is input to NAND gate 79. Gate 79 is equipped with additional input conductor 80 which comes from the power supply which is indicated by the numeral 81 in the upper corner of FIG. 1B. Inasmuch as the negative going signal on conductor 78 is present at the input, NAND gate 79 forms a one output which is next input to NOR gate 82. The gate 82 is connected to transistor 83 which is connected by means of an appropriate conductor to the input of additional NOR gate 84. NOR gate 84, in cooperation with NOR gate 85, and the appropriate resistors and capacitors, determine the timing of the circuit and form an output on conductor 86 which is time delayed. Conductor 86 is communicated through dropping resistor 87 to transistor 88, which is utilized as a switch. Transistor 88 is connected to variable voltage source 89 with grounding capacitor 90 for the purpose of providing a bias level to clock 91. The bias level controls the clock's speed. The clock is utilized for dialing, and hence, will form what will be called dialing pulses hereinafter. The clock is also used during the transmission of data pulses. The speed of the pulses is controlled by the adjustment on resistor 89. For dialing, the pulses are adjusted dependent on the particular make or manufacture of equipment utilized in the local telephone exchanges. The nominal rate of dialing is ten pulses per second. Further, the clock forms pulses which have the desired make-break ratio. While clock 91 forms a rectangular wave form, it is not perfectly symmetrical. The off and on time is varied, again dependent on the particular make or brand of telephone exchange equipment. The clock permits adjustment of this factor also, which is preferably tailored to the equipment.

One output of the clock is on conductor 92 and another is through the illustrated switching transistor and conductor 93. Conductor 93 is communicated through switching transistor 94 and over conductor 95 which extends from FIG. 1B to FIG. 1C. Conductor 95 is input through switching transistor 96 and after clipping by diode 97, is input to phone lines 10 and 11.

As should be recognized, a certain interval is required before the equipment seizes the telephone lines. An adjustment is provided to accommodate this interval through the auspices of resistor 99 which is then input to NOR gates 84 and 85 to provide the timed interval. The time delay circuit which includes these two NOR gates thus permits an adequate interval for seizure of the telephone lines by the equipment.

Continual control of transistor 96 is of some significance. Referring back to FIG. 1B, numeral 100 indicates a NOR gate which has a pair of inputs which are normally logic zero. With the logic zero inputs, the output becomes a one which is passed by series resistor 101 and diode 102. This causes transistor 94 to saturate which pulls line 95 close to ground potential which cuts off transistor 96. Transistor 96 is the sole connection between lines 10 and 11. In its normally conductive state, the impedence between the lines 10 and 11 is approximately 900 to 1000 ohms. When transistor 96 is cut off, the impedance between lines 10 and 11 rises to approximately 10,000 ohms or greater. Hence, control of transistor 96 constitutes the source of the necessary impedance levels to reflect the correct impedance into lines 10 and 11 as is required by the central telephone exchange equipment.

Attention is next directed to gate 104 which is connected to line 78. When line 78 changes levels toward a logical zero, this is sensed by NAND gate 104 and a one is formed on data line 105. The data line connects through time delay circuit 106. An output is formed on conductor 107 which is thereafter fed to circuitry shown in FIG. 1A which will be described hereinafter. Briefly, time delay circuitry 105 suppresses noises found on data line 105 and also shapes up the pulse for line 107 to be sure that the circuitry which is connected to it and shown in FIG. 1A responds properly.

Attention is next directed to FIG. 1A for explanation of the sequence counter indicated by the numeral 110. It is believed unnecessary to detail all operations of sequence counter 110 and so only a general or broad discussion will be given. Conductor 107 provides the necessary counts to a series of J-K flip-flops. The J-K flip-flops count through a cycle of ten states. The three left-hand J-K flip-flops are connected differently than the two right-hand flip-flops. A number of intermediate NOR gates serve as the decode matrix for various and sundry values assumed by the J-K flip-flops and their signals which uniquely enable ten NAND gates which provide the sequence counter itself. Toggle circuit 111 forms the odd and even numbers. The odd and even numbers are connected to several NAND gates 112 which form a ten state sequence counter. Obviously, the number of states in the sequence counter can be varied dependent on the nature of the telephone system, complexity of the message to be relayed, and so on. In the preferred embodiment, the first NAND gate indicates the dwell time which is associated with the seizure of the line and intiation of operation of the automatic dialing equipment found in the remote station. It has been assumed that the equipment is operated with a seven digit telephone system. That is to say, local calls are indicated by seven digits. The second through the eighth NAND gates in the grouping 112 are associated with the seven digits of the local call. This then leaves the eighth gate associated with the last digit of the call, and further provides some dwell or interval to permit completion of the call and answer by the central station which was shown in FIG. 2B. The ninth NAND gate of gates 112 is utilized for data transmission itself, the nature of which will be defined in greater detail hereinafter. The tenth and last gate is associated with cutoff of the equipment.

Because of the need of flexibility of the equipment, preferably the seven digits which are called by the equipment are adjustably set into the equipment. Inasmuch as the equipment can be installed at many different locations and the number to be called may vary from time to time or from region to region, the flexibility is achieved through the use of a clock dialing counter which is indicated by the numeral 115. This is shown at the lower portion of FIG. 1A. The clock dialing counter is somewhat similar to the counting mechanism 110 described. Inasmuch as it is quite similar, it is believed unnecessary to give excessive details of the clock dialing counter. Its use and function will be understood better through the use of examples of its connection. Assume for sake of discussion that the number to be called is 7777321. The seven output of clock dialing counter 115 is thus connected to four consecutive NAND gates, the second through the fifth gates inclusive, of the NAND gates 112. The three, two and one outputs of the clock dialing counter are connected to the sixth, seventh and eighth NAND gates 112, respectively. The flexibility of connection permits the equipment to dial any combination of numbers as may be desired. It is believed that the exemplary connection mentioned above will provide an understanding of how clock dialing counter 115 is connected with sequence counter 112 and the similarities of the two will become readily apparent as an assistance in construction and manufacture of the present invention.

The first eight NAND gates of sequence counter 112 are summed through a pair of additional NAND gates as an expediency to avoid placing too many inputs to a NAND gate. These NAND gates are then summed through an additional NOR gate which is connected with conductor 122 which extends from FIG. 1A to FIG. 1B to clock inhibit gate 123. As shown in FIG. 1B, the connection of gate 123 is apparent from the drawings, but its operation should be considered. When the seven digits representative of the number to be called are transferred through NAND gates 112 and on the conductor 122, gate 123 toggles to form an input for gate 82 previously mentioned. Gate 82 in effect sums the signals from the gates 79 and 123 and functions through the fixed delay determined by NOR gates 84 and 85 to initiate operation of clock 91. Thus, from gate 82 on, the circuitry associated with clock 91 functions in the same manner as previously described. When this circuitry functions in the customary and originally described manner, clock 91 makes and breaks in the formation of a pulse which is fed through conductor 93 to switching transistor 94 and conductor 95. Conductor 95 extends to FIG. 1C as previously mentioned and causes transistor 96 to switch from off to on in simulation of dialing pulses.

Returning again to FIG. 1A, the eighth NAND gate of the gates 112 is connected to conductor 116 which extends from FIG. 1A to FIG. 1B. Conductor 116 is input to flip-flop 117. Its output is connected through series resistor 118 and diode 119. When diode 119 becomes conductive, its voltage level is sufficiently high to override any pulses from the clock 91. Thus, flip-flop 117 is utilized to disable clock 91 and to prevent its further transfer of pulses to transistor 96 which simulates the dialing pulse. Inasmuch as clock 91 finds multiple purposes, its pulses will be utilized in other portions of the circuitry as will be described. After dialing has been completed, it is undesirable that transistor 96 simulate further pulses into the lines 10 and 11. For this purpose, flip-flop 117 and the cooperative circuitry mentioned prevents further transfer of clock pulses to the dialing simulation circuitry, including transistor 92.

An additional output of flip-flop 117 is indicated at NAND gate 128. This provides a signal on conductor 80 previously mentioned. Conductor 80 likewise causes disconnection of the line finder delay circuitry which also is connected with the sensor itself. As will be recalled, time delay circuitry 77 forms a delay to be sure that the equipment has seized the telephone line. The similarity in the signals on conductors 78 and 80 will be seen from this analogy.

Returning to the ninth gate of NAND gates 112 shown in FIGS. 1A, the number 130 indicates a gate which in effect sums the output of the ninth and tenth gates and supplies it to NOR gate 131. NOR gate 131 forms an output on conductor 132 which departs from FIG. 1A and is found in FIG. 1B.

Conductor 132 in FIG. 1B again connects with the clock inhibit gate 123. Thus, this gate again functions to create pulses through operation of clock 91. In summation, when the ninth gate is energized, clock 91 forms pulses on conductor 92 but, keeping in view that clock 91 is a multipurpose clock, no pulses are passed by transistor 94. This means that clock 91 is utilized to generate data under controls which will be described but there is no make and break in telephone lines 10 and 11 while this data is being transmitted.

Returning to FIG. 1A, as long as the equipment dwells on the ninth gate of sequence counter 112, data is transferred through the ninth gate and into the telephone lines in the following manner. The ninth gate is connected by conductor 140 which extends from the ninth gate to the count to the count storage register shown in FIG. 1C. In the upper portions of FIG. 1C, conductor 140 is found. A storage register shown in FIG. 1C is generally indicated by the numeral 142. It includes a right to left shift register comprised of several stages of J-K flip-flops. The flip-flops, in conjunction with NAND gates and appropriately wired presents form pulses which are summed through NOR gate 143 which is connected to the conductor 140.

The broad function of storage means 142 should now be considered. Several individual sensors are connected to it. The sensors are all indicated by the numeral 148. The nature of the sensors is subject to variation and is beyond the scope of the present disclosure. In any case, sensors 148 are shown as a matter of convenience and not a limitation on the present invention ranging in quantity up to nine. A particular sensor is triggered and this is data that is useful and should be transferred through the equipment. This data is variable data and is transferred through the several conductors which are connected to the data storage means 142. The data preferably includes five digits. The first is assigned to sensor 148 which is triggered and hence not preset. The next four digits indicate the assigned call number of the particular remote unit. The ninth state of the sequence counter transfers the variable data and is transferred in a manner as will be described hereinafter. Of significance is the fact that preset storage register means 142 shown in FIG. 1C forms a unique data code adaptable for transmission which identifies the particular sensor and the assigned call number of the remote station. All of this data is transferred through the ninth gate previously mentioned.

It will be observed that preset storage register means 142 functions in response to clock 91. It is connected with conductor 92 which inputs the clock pulses. At the completion of counting, the output signal is formed on the conductor 150 to so indicate.

The last state of sequence counter 110 should next be considered. The tenth NAND gate indicates the end of data transmission and terminates operation of the equipment. The tenth gate is connected through gate 130 to NOR gate 131 to form a signal on conductor 132. This is connected to clock inhibit gate 123 shown in FIG. 1B. It inhibits operation of the clock and does not toggle again, and hence, the clock is withheld indefinitely. However, the state of the clock system described to this juncture resembles that of earlier states, and hence, the equipment is still left in an "on" condition. Attention is directed to conductor 152 which is connected to the ninth gate and which provides the pulses from the ninth gate on conductor 152 to the power supply shown in the upper left-hand corner of FIG. 1B. There, conductor 152 is input to a switching transistor. The gate switching transistor is indicated by the numeral 153. Switching transistor 153 controls operation of additional switching transistor 154. Transistor 154 is connected to conductor 155. Conductor 155 is next shown in FIG. 1C. Conductor 155 provides power for an oscillator circuit which is indicated generally by the numeral 160. The oscillator circuit forms a tone at a pre-set frequency, such as 400 hertz.

At this juncture, strong emphasis should be placed on the two types of pulses which are formed by the present invention. The dialing pulses are formed by making and breaking lines 10 and 11. This is simulated by transistor 96. Data pulses in the form of tone bursts are formed by oscillator 160. Oscillator 160 forms a tone at the selected frequency which is transferred through several stages of amplification through coupling transformer 161. Transformer 161 is connected to line 10 and inputs the tones into the telephone system. Thus, the two classes of pulses have been described as make and break on the one hand, and tone pulses on the other, and further, both are derived from the same clock 91. The two types of pulses are both input to lines 10 and 11. The only difference is the utilization of oscillator 160 to form tones and switching transistor 96 to form the pulses.

Considering the sequence counter broadly, the transfer of dialing pulses requires making and breaking of the line connection. On the other hand, the transfer of data through the use of tone oscillator 60 requires that the line be held. For this purpose, attention is directed to flip-flop 117 at the top of FIG. 1B. Conductor 175 extends from that flip-flop to FIG. 1C. In FIG. 1C, conductor 175 turns on switching transistor 176. When it is turned on, it makes possible current flow through a complementary pair of transistors 177 and 178. Diodes 179 and 180 merely steer current flow to ground. With the complementary pair, it is of no consequence which line of lines 10 and 11 is relatively positive. In essence, the primary of the transformer 161 which is connected across lines 10 and 11 is connected in series with a small resistance on the order of three to five ohms. In effect, the line connection is held by the effective grounding of the upper end of the primary of transformer 161.

AC signals are likewise grounded through capacitor 182 which is likewise grounded from the primary of transformer 161.

To this juncture, the circuitry which causes the sequence counter to count from one state to the next has not been clearly identified. It will be noted that there are ten NAND gates 112. The advance from one gate to the next will next be considered. In FIG. 1B, NAND gate 104 is provided with two inputs, one from linefinder delay circuitry 77 and the other from gate 123. Recalling the inputs to gate 123, it will be noted that all ten states of the sequence counter create signals which pass through gate 123. Hence gate 104 becomes cognizant of each change of state of sequence counter 110 shown in FIG. 1A. It forms a signal on conductor 105, which, after due shaping by the noise suppressing and pulse shaping circuitry 106, forms a pulse on conductor 107 which in input to the ten state counter at the lower portions of FIG. 1A. This advances this counter and causes the sequence counter to advance by enabling the next NAND gate of the plurality of gates at 112.

There exists a possibility that a number might be misdialed. This is possible due to noise on the line, malfunction of the central exchange, and numerous other reasons. It is preferable that the remote station receive back from the central station a verification tone indicating that a correct number has been dialed and the call completed, i.e., a telephone connection has been made between the two stations. For this purpose the central station, as shown in FIGS. 2A and 2B, includes a tone forming circuit. This circuit forms a tone and transmits it back through telephone lines 10 and 11. This tone is received by lines 10 and 11 shown in FIG. 1C and is coupled through transformer 161. This input tone is next connected through a tone amplifier which is generally indicated by the numeral 200. The tone amplifier amplifes and frequency discriminates the incoming tone. If the tone is inappropriate as to either frequency or amplitude, the equipment will take necessary steps to redial the number, and re-dialing is continued until the correct number is dialed and the proper tone is received from the central station.

For consideration of the tone amplifier and its function, attention is directed to FIG. 1C. Tone amplifier 200, an amplifier which is believed does not require excessive description, responds only to input signals of the preselected frequency range of the tone pulses of the tone generator of the central system. When such a pulse is received, the tone amplifier forms a DC level which is input to NOR gate 201. One output of NOR gate 201 is over conductor 201a which is input to the eighth NAND gate shown in FIG. 1A. Conductor 201a is also shown in that view. NOR gate 201, in conjunction with additional gate 202, forms a time delay circuit. The length of the delay is determined by the voltage level furnished and the appropriate resistors and capacitors connected to NOR gates 201 and 202. Hence, once amplifier 200 recognizes the return tone from the central station, a signal is formed on conductor 203 which enables continuation of the operation.

Conductor 203 is next input to a reset control indicated generally by the numeral 204. The circuitry at 204 forms a signal on conductor 205 which is returned to FIG. 1A at the lower lefthand portion.

Operation of the equipment in the presence of a proper tone from the central station is believed understood. If the central station transmits a tone which is recognized by tone amplifier 200, a signal is formed on the conductor 201a which is returned to the eighth gate and causes the sequence counter to step to the ninth gate for transmission of the data which will be duly received and recorded. The output signal also discharges capacitor 214 of the reset control circuit to ground starting another time cycle for this circuit.

Suppose, for sake of discussion, that a wrong number is dialed, or for some reason the telephone continues ringing with no answer. This denies the remote unit the tone pulse from the central station that indicates the completion of the telephone connection between the two stations. On absence of such a tone pulse to amplifier 200, no signal is formed on conductor 201a. Count sequencer 110 dwells on the eighth gate, and hence, the eighth state. After an interval, flip-flop 117 shown in FIG. 1B recognizes the end of the dialing sequence and forms on output signal which is sensed by gate 128 previously described which forms a signal on conductor 80. Conductor 80 is input through series resistor 210 which turns on transistor 211 shown in power supply circuitry 81. Transistor 211 turns on transistor 212 which furnishes power over conductor 213 to tone amplifier 200 and reset control 204. The reset control, when provided with B+ voltage on conductor 213, begins charging capacitor 214. Once the capacitor is charged to an adequate level, transistor 215 begins to conduct. When this transistor begins to conduct, a signal is formed on conductor 205 which returns to the sequence counter at the lower left-hand corner of FIG. 1A. This line is connected in common to the J-K flip-flops which comprise sequence counter 110 and resets them to the first state. When this is achieved, first NAND gate 112 is thus enabled and the telephone number is re-dialed.

It should be noted that the transfer of data has been aborted in the sequence just described. The particular number identifying the remote station has not been transferred, and the perishable data which indicates which of the sensors 148 shown in FIG. 1C has been tripped has not been transferred. Only after all of this data has been transferred does transistor 220 shown in the lower left-hand corner of FIG. 1A form a reset signal on the conductor 220a which is then supplied to count storage unit 142 generally indicated in FIG. 1C. At this juncture, the perishable data is reset. This indicates that the data has been transferred inasmuch as the count sequence means of FIG. /A is cycled from its first state fully back around to the first state. It then dwells on the first state and the equipment next prepares to drop the telephone line which has been seized. Dropping of the seized line is achieved through an additional toggle of the flip-flop 117 which is also common to clear line 220a.

As stated above, when the call is completed and a telephone connection has been established between the two stations, the output of NOR gate 201 is transmitted to the eighth NAND gate which steps the sequence counter to the ninth gate. The data from the count storage units is now transmitted to the central station by appropriate spaced tone pulses supplied to line 10 by tone oscillator 160. As each tone pulse reaches the central station, tone generator 18 simultaneously sends a tone back to the remote station of a preselected frequency and amplitude and of the same duration as the pulse received. This verification tone pulse is received by the tone amplifier at the remote station. If the pulse received is proper, gate 202 provides a voltage on connector 203 to discharge capacitor 214 to ground before the reset control times out.

Thus, if each data pulse is not verified by the receipt at the remote station of a proper tone pulse, the reset control will reset the sequence counter to the first stage and the cycle repeated, including redialing the number of the central station. As explained above, the entire cycle is completed because the failure to receive a verification pulse could be caused by the two stations being permaturely disconnected.

Attention is next directed to data line 105 shown in FIG. 1B. It will be observed that the levels on this line rise and fall as the sequence counter steps from state to state. The dialing of the sequence counter, particularly the first seven digits which identify the telephone number to be called, is controlled by clock dialing counter 115. It is apt to note that this counter 115 has to be reset after each use inasmuch as it is connected in common to the first several states of the sequence counter. The sequence counter is provided with conductor 230 which is shown in FIG. 1B. Circuitry generally indicated at 233 is made responsive to the rise and fall of the levels on data line 105. As the data line advances from state to state in sequence with the sequence counter 110, the fall in voltage is transferred through pulse shaping circuitry to a pair of NOR gates which form a delayed signal. The NOR gates are indicated by the numerals 234 and 235. These gates, in conjunction with associated capacitors and resistors, form an output signal for transistor 236. When transistor 236 is switched on, a reset pulse on conductor 230 is formed and is supplied to clock dialing counter 115 to reset it to its first state.

It will be understood that the resetting of the clock data counter enables each number to be dialed from one and prevents the register from accumulating the counts of the several numbers or digits to be dialed.

The foregoing has been directed to a description of the remote station. While it would be of interest to recite the entirety of the sequence of operation, it is believed that the sequence of operation has been given in smaller and more readily understood portions in describing the circuitry itself. Hence, for those who are interested in how the remote station operates, the entirety of the description of the circuitry is referred to inasmuch as the descriptive sequence of operation and interrelationship of the equipment is dispursed throughout that description.

While many variations and alterations in the present invention may be implemented, the scope of the present invention is determined by the claims which are appended hereto.

The invention having been described, what is claimed is:

1. Apparatus for use with a telephone system for automatically sending data from a remote station to a central station comprising a central station and a remote station connected into said telephone system, means at the remote station for dialing the central station when actuated by a sensor, such as a temperature sensitive device, means at the central station for transmitting to the remote station a verification tone pulse of preselected frequency and amplitude simultaneously with the receipt of a tone pulse from the remote station and for the same duration as the pulse from the remote station, means at the remote station for sending data to the central station in spaced pulses, and means at the remote station to cause the remote station to redial and retransmit the data if a verification pulse is not received by the remote station for each pulse transmitted to the central station.

* * * * *